(12) United States Patent
Alexandrov et al.

(10) Patent No.: US 9,388,677 B2
(45) Date of Patent: Jul. 12, 2016

(54) METHOD AND APPARATUS FOR THERMALLY TREATING AN OIL RESERVOIR

(75) Inventors: Eugeny Nikolaevich Alexandrov, Moscow (RU); Dmitry Anatoljevich Lemenovski, Moscow (RU); Zdenek Koller, Prague (CZ)

(73) Assignee: VISCOS ENERGY SERVICES AG, Zug (CH)

( * ) Notice: Subject to any disclaimer, the term of this patent is extended or adjusted under 35 U.S.C. 154(b) by 259 days.

(21) Appl. No.: 13/818,142

(22) PCT Filed: Aug. 24, 2010

(86) PCT No.: PCT/EP2010/062356
§ 371 (c)(1),
(2), (4) Date: May 2, 2013

(87) PCT Pub. No.: WO2012/025150
PCT Pub. Date: Mar. 1, 2012

(65) Prior Publication Data
US 2013/0206400 A1 Aug. 15, 2013

(51) Int. Cl.
E21B 43/24 (2006.01)
C09K 8/592 (2006.01)

(52) U.S. Cl.
CPC ............... *E21B 43/24* (2013.01); *C09K 8/592* (2013.01)

(58) Field of Classification Search
CPC ... E21B 43/162; E21B 43/166; E21B 43/168; E21B 43/24
See application file for complete search history.

(56) References Cited

U.S. PATENT DOCUMENTS

| | | | |
|---|---|---|---|
| 1,816,260 A | 7/1931 | Edward | |
| 3,126,961 A | 3/1964 | Craig | |
| 3,163,211 A | 12/1964 | Henley | |
| 3,620,571 A * | 11/1971 | Billings | 299/6 |
| 8,387,697 B2 * | 3/2013 | Alexandrov et al. | 166/302 |

FOREIGN PATENT DOCUMENTS

| | | |
|---|---|---|
| RU | 2100583 C1 | 12/1997 |
| RU | 2126084 C1 | 2/1999 |

(Continued)

OTHER PUBLICATIONS

Search Report for International Application No. PCT/EP2010/062356 mailed Apr. 19, 2011.

*Primary Examiner* — William P Neuder
(74) *Attorney, Agent, or Firm* — Pearl Cohen Zedek Latzer Baratz LLP

(57) ABSTRACT

It is provided a method and an apparatus for continuously thermally treating an oil reservoir, in particular a method and an apparatus for thermally treating an oil reservoir by separately introducing a first and a second composition into an oil well and contacting the first and second compositions in a pay zone of the oil reservoir to initiate a chemical reaction producing heat and gases. With the method and apparatus according to the present invention it becomes possible to simultaneously introduce the compositions into the oil well and to extract the resultant oil or oil containing mixture through the same oil well. For this a sealing device like a packer, and at least one tubing are arranged in the oil well such that the sealing device is positioned in the pay zone of the oil reservoir and that openings in the casing of the oil well are located above and below the sealing device and the tubing extends through the packer and comprises at least one opening below the packer, wherein the packer seals the annular space between the outside of the tubing and the inside of the casing of the oil well so that two fluid passages are provided having no fluid connection inside the oil well. Thermal treatment is achieved by separately introducing the first and second compositions into the oil well through the resultant fluid passages, initiating a chemical reaction by contacting the compositions in the pay zone of the oil reservoir. The chemical reaction can be maintained by introducing at least one of the two compositions and the resultant oil or oil containing mixture can be extracted at the same time through the oil well.

22 Claims, 2 Drawing Sheets

(56) References Cited

FOREIGN PATENT DOCUMENTS

Figure 1:
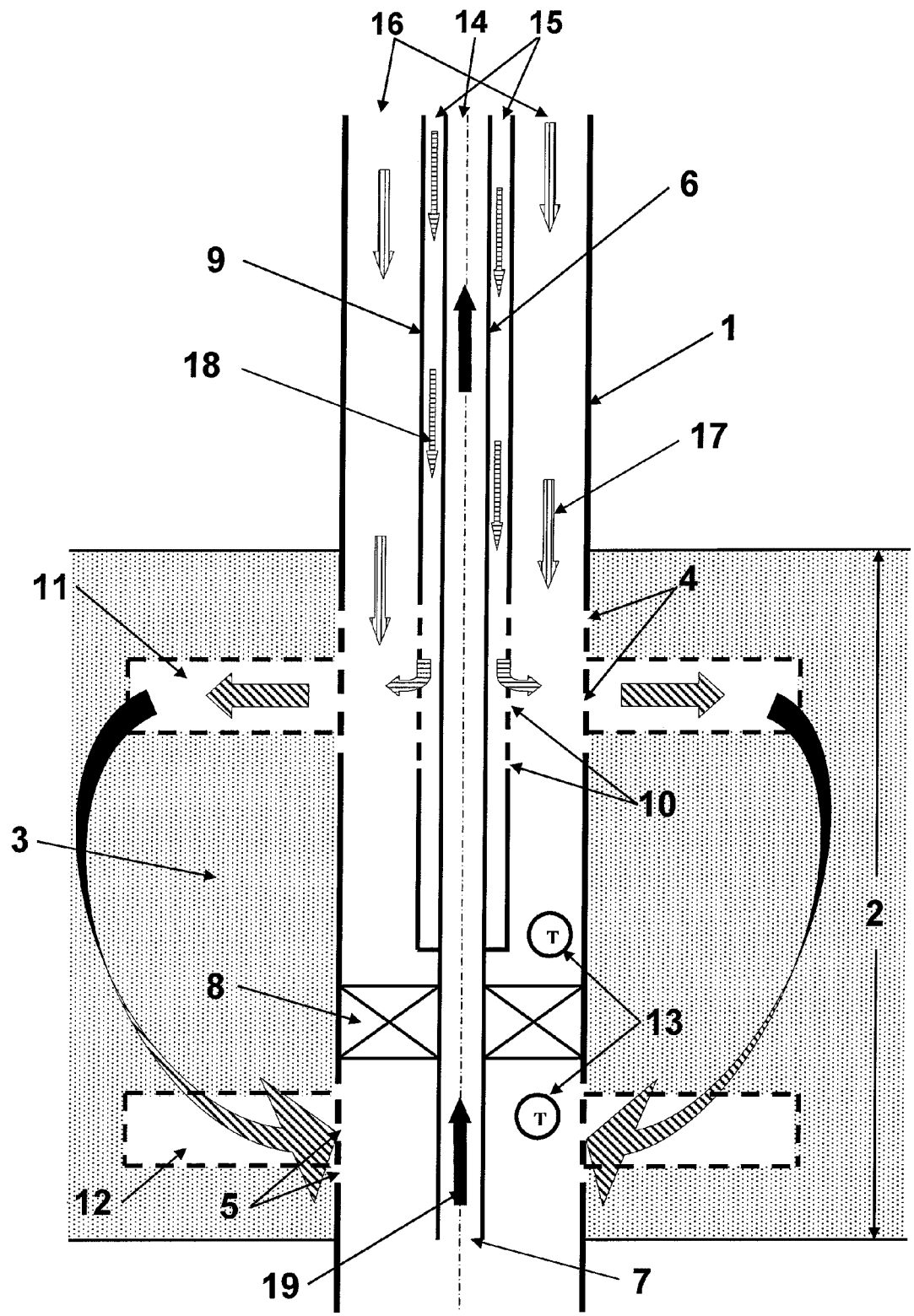

| RU | 2153065 | C1 | 7/2000 |
| RU | 2194156 | C1 | 12/2002 |
| RU | 2224103 | C1 | 2/2004 |
| WO | WO 2010/043239 | | 4/2010 |

* cited by examiner

METHOD AND APPARATUS FOR THERMALLY TREATING AN OIL RESERVOIR

CROSS-REFERENCE TO RELATED APPLICATIONS

This application is a National Phase Application of PCT International Application No. PCT/EP2010/062356, International Filing Date Aug. 24, 2010, entitled "METHOD AND APPARATUS FOR THERMALLY TREATING AN OIL RESERVOIR", published on Mar. 1, 2012, as International Publication No. WO 2012/025150, and is hereby incorporated by reference in its entirety.

BACKGROUND OF THE INVENTION

The invention is directed to a method and an apparatus for thermally treating an oil reservoir, in particular to a method and an apparatus for thermally treating an oil reservoir by separately introducing a first and a second composition into an oil well and contacting the first and second compositions in a pay zone of the oil reservoir to initiate a chemical reaction producing heat and gases.

The method and apparatus according to the present invention are especially useful for extracting petroleum (in the following also named as "crude oil" or simply "oil") from water-flooded oil reservoirs.

The extraction of petroleum from an oil reservoir usually starts with recovery methods using underground pressure in the oil reservoir which will force the oil to the surface. Over the lifetime of the oil well the pressure decreases, and it becomes necessary to use other extraction methods such as using pumps or injecting water, natural gas or other gases into the oil well to bring the oil to the surface. After these recovery methods are no longer effective the oil reservoir usually still contains considerable amounts of petroleum being enclosed in small cavities or pores of the rock or sand formations.

To recover also these remaining amounts of petroleum tertiary oil recovery methods are used which mainly have the aim to reduce the viscosity of the petroleum. One common method is to inject hot steam into the oil well to heat the petroleum and thus to reduce its viscosity. This method, however, is efficient only up to a depth of about 1 km as otherwise the hot steam will be cooled down before reaching the pay zone. Further, with this method up to 3 to 5 months of injecting hot steam are necessary to heat up the pay zone. For producing the hot steam up to 20 to 30% of the extracted oil is used so that the efficiency of such method is limited.

The injection of hot steam into the oil well is for instance used in the SAGD method (steam assisted gravity drainage). This method is especially used in Canada to extract oil from Canadian oil sands. In the SAGD method, two parallel horizontal oil wells in a length of up to about 200 m are drilled in the pay zone of the oil reservoir, one about 4 to 6 meters above the other. In the upper well hot steam is injected, and the heated crude oil or bitumen that flows out of the formation, along with any water from the condensation of injected steam is collected by the lower one of the horizontal oil wells and pumped to the surface. As a result of the temperature increase in the heated area of the oil reservoir the viscosity of heavy crude oil or bitumen is reduced which allows it to flow down into the lower wellbore. Further fractures may be generated in the formation as a result of differential thermal expansion what further improves the flow of oil to the lower wellbore.

One of the major disadvantages of the SAGD method are the high costs for producing the hot steam. Up to about 20 to 30% of the extracted oil are needed for its production. Further, as already mentioned above, the injection of hot steam is efficient only up to a depth of about 1 km as otherwise the hot steam will be cooled down before reaching the pay zone. In addition, large amount of water and large water recycling facilities are needed, wherein the availability of water is sometimes a constraining factor.

Alternatively, surfactants or solvents can be injected into the oil well to leach out the petroleum. These methods however, have the disadvantages that the extracted petroleum will be contaminated by these chemicals so that additional efforts and costs are necessary to recover the petroleum.

A further tertiary oil recovery method is characterized in that a chemical reaction is initiated in the pay zone of the oil reservoir to produce hot gases which heat up the oil in the pay zone to reduce its viscosity and to support oil recovery by increasing the pressure in the oil well.

In the Russian patent applications RU 2 100 583 C1, RU 2 126 084 C1 and RU 2 153 065 C1 are disclosed fuel and oxidizing compositions (FOC) being able to produce hot gases after initiating a chemical reaction. These compositions are intended to be introduced into the oil well of an oil reservoir for a thermochemical treatment of the pay zone. These chemical compositions are aqueous solutions containing large amounts of up to 60% by mass or more of ammonium nitrate, $NH_4NO_3$. The other components of these FOC are for instance glycerin, nitric acid, carbamide, potassium permanganate, acetic acid, isopropyl metacarborane and acetylsalicylate. After injection of the FOC into the oil well it is ignited by initiating a fuse explosion. The decomposition of 1 kg of FOC results in emitting a quantity of heat of about 500-1000 kcal.

These FOC contain an excess of oxygen and hence have a substantial oxidizing character, so that with the admixture of petroleum an explosive composition is created. Further, aqueous solutions containing large amounts of ammonium nitrate are explosive if the water content is below a critical amount of about 16-18% by mass. Hence, in view of a safety handling of such compositions the water content is usually above 26-28% by mass. However, with increasing water contents it becomes more and more difficult to achieve a stable reaction with a high output of heat.

In the RU 2 194 156 C1 the FOC contains mainly the reaction product of nitric acid with an alkanolamine, alkyl amine or alkyl polyamine and up to 2.0 to 35.0% by mass of an inorganic nitrate such as ammonium nitrate, potassium nitrate, sodium nitrate or calcium nitrate. With such composition a more safety handling was achieved as the amount of ammonium nitrate could be reduced substantially. However, with the usual way of igniting the FOC by means of a fuse explosion, for safety reasons a mass of maximum 1 to 2 tons can be ignited only. After decomposition of the FOC feed with a mass of 1 to 2 tons the whole operation of the FOC delivery and initiating charge insertion has to be repeated so that at an oil well with a depth of 1 to 2 km not more than about 10 tons of FOC can be reacted per day. If the oil well depth is about 3 to 4 km the amount of FOC to be reacted per day with this method decreases to about 5 tons. Hence, the extent of heating the pay zone and thus the efficacy of this method is limited.

In RU 2 224 103 C1 are described a method and a device for thermochemical treatment of a productive layer. Like in the prior art mentioned before a combustible oxidizing composition comprising ammonium nitrate and water is pumped down into the oil well and is then contacted with an igniting material. The device used with such compositions and described in this document comprises two coaxially arranged pipes for separately introducing the compositions into the oil well. By use of sealing devices an enclosure is formed which encloses the igniting material. At the upper and lower ends of this enclosure shear pins are arranged being able to open the enclosure and allow ignition of the chemical reaction. However, neither the method nor the device described in RU 2 224 103 C1 are efficient when used in water-flooded oil formations as they do not allow to maintain a stable and continuing reaction in the pay zone of the oil reservoir.

In WO 2010/043239 A1, the disclosure of which is hereby incorporated by reference, is described a chemical system of gas evolving oil viscosity diminishing compositions (GEOVDC) for stimulating the productive layer of an oil reservoir for thermally treating an oil reservoir. These compositions are a thermal gas emitting composition (TGEC) and a reaction initiator stabilizer (RIS). By separately introducing these two compositions into the oil well and contacting them in the pay zone of the oil reservoir a chemical reaction is initiated producing heat and evolving gases so that the extraction of oil (petroleum) is improved. This system allows to initiated and maintain a stable and continuous reaction so that the compositions can be continuously introduced even after the chemical reaction was initiated. Up to about 100 tons per day can be reacted so that the efficiency of the oil recovery process is improved.

In the WO 2010/043239 A1 are further described different apparatus for thermally treating an oil reservoir by using this chemical system. However, for providing these apparatus it is often necessary to manufacture specific components what increases the costs for the thermal treatment. Further, when using the methods and apparatus described in this document it is not possible to introduce the compositions into the oil well and to extract the resultant oil or oil containing mixture at the same time through the same oil well. When simultaneous thermochemical treatment and oil extraction is intended it is necessary to use one oil well as an injection well and a second oil well as a producing well what limits the efficiency of this method.

It is therefore the object of the present invention to provide a method and an apparatus for thermally treating an oil reservoir, especially a water-flooded oil reservoir, being simple and cost efficient in use and allowing a flexible control of the steps of introducing and extracting material into or out of the oil well.

SUMMARY OF THE INVENTION

The above object is solved by providing a method of continuously thermally treating an oil reservoir comprising the steps of:

initiating a chemical reaction producing heat and gases for thermally treating the oil reservoir to obtain extractable oil or an extractable oil containing mixture by separately introducing into an oil well of said oil reservoir a first and a second composition through separated fluid passages provided in said oil well and contacting the first and second compositions in the pay zone of the oil reservoir;

maintaining the chemical reaction in the oil reservoir by continuing the introduction of at least one of said first and second compositions; and extracting the resultant oil or oil containing mixture during said step of maintaining the chemical reaction through a fluid passage provided in said oil well, wherein inside said oil well the fluid passage used for extracting the oil or oil containing mixture has no fluid connection with any fluid passage used for continuing the introduction of at least one of said first and second compositions to maintain the chemical reaction.

The method of the present invention is based on the principle that in the pay zone of an oil reservoir to be thermally treated a chemical reaction is initiated and maintained producing heat for the thermal treatment and preferably also gases to promote the thermal treatment and the extraction of oil. Such chemical reaction is initiated by contacting two compositions (chemical compositions) in the pay zone of the oil reservoir and is maintained by a continuous introduction of at least one of these two compositions.

The two compositions are introduced separately into the oil well of the oil reservoir and contacted in the pay zone of the oil reservoir to initiate the chemical reaction. For such separate introduction of the two compositions at least two separated fluid supply passages are provided in the oil well. With these separated fluid supply passages the two compositions can be introduced into the oil well without contacting or admixing before reaching the pay zone.

It is mentioned above, that with the method according to the present invention the oil or oil containing mixture is extracted during the step of maintaining the chemical reaction. It is, however, the intention that with the method according to the present invention the oil or oil containing mixture can likewise be extracted after the step of maintaining the chemical reaction was stopped or interrupted.

According to a first embodiment of the method of the present invention inside said oil well the separated fluid passages used for introducing the first and second compositions have no fluid connection, the first and second compositions are passed through openings in the casing of the oil well allowing fluid exchange between the oil well and the oil reservoir, and the first and second compositions are contacted outside of the casing of said oil well to initiate the chemical reaction.

With respect to the first embodiment of the method of the present invention the separated fluid passages used for introducing the first and second compositions and the fluid passage used for extracting the oil or oil containing mixture are provided in said oil well by arranging one or more tubings each comprising at least one opening in its distal end section such that the distal end section of each of the one or more tubings is located in the pay zone of the oil well, and by arranging a sealing device in said oil well such that the openings in the casing of the oil well allowing fluid exchange between the oil well and the oil reservoir are located above and below the sealing device and such that one tubing extends through the sealing device, so that the at least one opening in the distal end section of this tubing is located below the sealing device, and the sealing device seals the space between the outside of the tubing extending through the sealing device and the inside of the casing of the oil well.

According to a second embodiment of the method of the present invention the separated fluid passages used for introducing the first and second compositions have fluid connection in the pay zone of the oil well (i.e. inside the oil well) and the first and second compositions are contacted in the pay zone of the oil well (i.e. inside the oil well), wherein the method further comprises the step of transferring the chemical reaction into the oil reservoir by passing the contacted compositions through openings in the casing of the oil well allowing fluid exchange between the oil well and the oil reservoir.

With respect to the second embodiment of the method of the present invention the separated fluid passages used for introducing the first and second compositions and the fluid passage used for extracting the oil or oil containing mixture are provided in said oil well by arranging two tubings each comprising at least one opening in its distal end section such that the distal end section of each tubing is located in the pay zone of the oil well, and by arranging a sealing device in said oil well such that the openings in the casing of the oil well allowing fluid exchange between the oil well and the oil reservoir are located above and below the sealing device and such that one of the two tubings extends through the sealing device so that the at least one opening in the distal end section of this tubing is located below the sealing device and the at least one opening in the distal end section of the other tubing is located above the sealing device and the sealing device seals the space between the outside of the tubing extending through the sealing device and the inside of the casing of the oil well.

In both embodiments of the method of the present invention the oil or oil containing mixture being the result of the thermal treatment of the oil reservoir is extracted through one of the fluid passages (in the following also named "fluid extract passage") provided in the oil well. This fluid extract passage is provided such that inside the oil well no fluid connection is possible between the fluid extract passage and the fluid passage or fluid passages (in the following also named "fluid supply passages") used for supplying the fluids or compositions to initiate and/or maintain the chemical reaction. That is, inside the oil well the fluid extracted through the fluid extract passage cannot contact or admix with the fluid or fluids introduced through the fluid supply passage(s).

When using the method of the present invention according to the first embodiment it is necessary to provide only one tubing being arranged such that it extends through the sealing device, so that the at least one opening in the distal end section of this tubing is located below the sealing device. With such arrangement two separate fluid passages are provided, a first fluid passage defined by the inside of the tubing and the inside of the casing of the oil well below the sealing device and a second fluid passage defined by the inside of the casing of the oil well above the sealing device. This allows to separately introduce the two compositions and to contact them outside of the oil well in the pay zone of the oil reservoir to initiate the chemical reaction. This further allows to extract the oil or oil containing mixture during said step of maintaining the chemical reaction as then only one fluid passage is needed to maintaining the chemical reaction so that the other one of the two fluid passages can be used as the fluid extract passage. A respective arrangement can be derived from the apparatus depicted in FIG. 1 by omitting the outer tubing 9.

When using the method of the present invention according to the second embodiment where the two compositions are contacted in the pay zone of the oil well, i.e. inside the oil well, and where the chemical reaction is then transferring into the oil reservoir by passing the contacted compositions through openings in the casing of the oil well it is necessary to provide in addition to the above mentioned one tubing (i.e. first tubing) a second tubing being arranged such that the at least one opening in its distal end section is located in the pay zone of the oil well above the sealing device.

With such arrangement of two tubings and one sealing device three fluid passages are provided in the oil well. One of these fluid passages is defined by the inside of that tubing extending through the sealing device. As the sealing device seals the space between the outside of this tubing and the inside of the casing of the oil well this fluid passage has no fluid connection with the other fluid passages and can be used as the fluid extract passage.

Two further fluid passages are defined by the inside of the other tubing and by the inside of the casing of the oil well. These two fluid passages have fluid connection in the pay zone of the oil well as in the distal end section of the other tubing at least one opening is provided in the pay zone. These two fluid passages can be used as the fluid supply passages.

According to a specific embodiment of the method of the present invention the two tubings are arranged coaxially defining an inner and an outer tubing, the inner tubing extending through the sealing device and defining a first fluid passage (together with the inside of the casing of the oil well below the sealing device), a second fluid passage is defined by an annular space between the outside of the outer tubing and the inside of the casing of the oil well and a third fluid passage is defined by an annular space between the outside of the inner tubing and the inside of the outer tubing. A respective arrangement is depicted in FIG. 1.

It is, however, also possible to arrange the two tubings side by side in the oil well in either a spaced or adjacent arrangement.

Such arrangements using at least two tubings allow to separately introduce the two compositions or only one composition and to extract the at the same time the oil or oil containing mixture through the fluid passage (fluid extract passage) defined by the inside of the first tubing extending through the sealing device and the inside of the casing of the oil well below the sealing device.

With the method of the present invention it is possible to either introduce separately two different compositions or to introduce only one composition, but in any case to simultaneously extract the resultant oil or oil containing mixture through the same oil well.

For providing the openings in the casing of the oil well allowing fluid exchange between the oil well and the oil reservoir the casing may be perforated or slotted.

In this specific embodiment in the step of initiating the chemical reaction one of the first and second compositions is introduced into the oil well through one of the second and third fluid passages and the other one of the first and second compositions is introduced into the oil well through the other one of the second and third fluid passages and in the step of extracting the resultant oil or oil containing mixture it is extracted through the first fluid passage.

The first fluid passage defined by the inside of the inner tubing provides a fluid connection to that part of the pay zone of the oil well located below the sealing device and through the openings in the casing of the oil well also to the oil reservoir. The inner tubing comprises at least one opening in its distal end section wherein this opening may be provided by an open end of the tubing and/or by a perforated or slotted distal end section of the inner tubing. The inner tubing extends through the sealing device such that the at least one opening of the inner tubing is located below the sealing device and no opening is present above the sealing device. As such sealing device a packer can be used for instance. The sealing device or packer seals the resultant annular space between the outside of the inner tubing and the inside of the casing of the oil well. A fluid injected or extracted through this first fluid passage will not be mixed in the oil well with any of the fluids injected or extracted through the second and third fluid passages.

The second and third fluid passages are provided by inserting an outer tubing such that the outer tubing encloses the inner tubing. That is, the inner and outer tubing are arranged substantially coaxial. The outer tubing comprises at least one opening in its distal end section wherein this opening may be provided by an open end of the tubing and/or by a perforated or slotted distal end section of the inner tubing. The at least one opening of the outer tubing is located above the packer and preferably close to the openings in the casing of the oil well being likewise located in the pay zone above the packer.

With the second and third fluid passages it is possible to separately introduce (supply) two different fluids into the oil well without admixing them before they reach the pay zone of the oil well. At the distal end section of the outer tubing where the at least one opening is provided the fluid injected through the second fluid passage, i.e. through the outer tubing, passes the at least one opening in the distal end section of the outer tubing and enters the third fluid passage where the other fluid is injected.

The first and second compositions are usually solutions or suspensions and are supplied by means of suitable pumps. As the pumping of the first and second compositions is continued after contacting them in the pay zone of the oil well the mixed compositions are passed through the openings in the casing of the oil well, located above the packer (the sealing device), into the oil reservoir, so that the reaction initiated in the pay zone of the oil well is transferred into the oil reservoir for thermally treating it.

As a result of the temperature increase the viscosity of the oil is reduced and fractures may be generated in the formation what improves extraction of the oil so that oil or an oil containing mixture is obtained being able to penetrate through the openings in the casing located below the packer to be extracted through the first fluid passage.

The chemical reaction in the oil reservoir is maintained by continuing the introduction of at least one of said first and second compositions.

The method of the present invention as described above is characterized by the steps of introducing the chemical compositions, initiating and maintaining a chemical reaction in the pay zone of the oil reservoir and extracting the oil or oil containing mixture being the result of the thermal treatment.

Thus according to a preferred embodiment this method may further comprise the step of installing in the oil well of the oil reservoir an apparatus for thermally treating an oil reservoir comprising a sealing device and a tubing comprising at least one opening in its distal end section, wherein the sealing device is positioned in the pay zone of the oil reservoir, such that said openings in the casing of the oil well are located above and below the sealing device;

the tubing comprising at least one opening in its distal end section is arranged in the oil well such that it passes through the sealing device so that the at least one opening is located below the sealing device and the sealing device seals the resultant annular space between the outside of the tubing and the inside of the casing of the oil well wherein the inside of the tubing defines a first fluid passage and the inside of the casing of the oil well above the sealing device defines a second fluid passage.

According to a further preferred embodiment of this method the apparatus as installed above comprises in addition to the tubing passed through the sealing device, i.e. the first tubing, a second tubing comprising at least one opening in its distal end section being arranged in the oil well such that the distal end and the at least one opening of the second tubing is positioned in the pay zone above the sealing device wherein the inside of the second tubing defines a third fluid passage and the apparatus allows fluid exchange between the second and third fluid passages in the pay zone of the oil well. The first and second tubings may be arranged coaxially so that the first tubing forms an inner tubing and the second tubing forms an outer tubing. It is, however, also possible to arrange the two tubings side by side in the oil well in either a spaced or adjacent arrangement.

In the above steps of installing in the oil well of the oil reservoir an apparatus for thermally treating an oil reservoir the sealing device may be a packer.

In the method of the present invention it is further preferred that the packer is positioned in the pay zone of the oil well in a section or area which comprises no openings. That is, the packer is installed in a section being not perforated or slotted, wherein above and below this section the casing of the oil well comprises openings allowing the fluid exchange between the oil well and the oil reservoir.

It is further preferred to provide horizontal wells being located in the pay zone of the oil reservoir being in fluid connection with the oil well. These horizontal wells can be used to better distribute the compositions introduced into the oil well and to collect the resultant oil or oil containing mixture.

For this at least one pair of horizontal wells are drilled in the pay zone of the formation surrounding the oil well wherein each pair of horizontal wells consist of an upper well and a lower well. The upper and lower wells of one pair of horizontal wells are substantially arranged parallel to each other, i.e. they are substantial vertically aligned, or the upper and lower wells of one pair of horizontal wells are arranged to approach each other. That is, with growing distance from the oil well the almost horizontal upper and lower wells get closer to each other ending at a distance of about 0.4 to 0.5 m from each other. In a specific embodiment the approaching upper and lower wells intersect, preferably at their distal ends.

The upper ones of the horizontal wells are arranged such that they are in fluid connection with that part of the oil well located above the packer and the lower ones of the horizontal wells are arranged such that they are in fluid connection with that part of the oil well located below the packer.

When using the first embodiment of the method according to the present invention where the two compositions are contacted outside of the oil well one of the first and second compositions is supplied through the fluid channel defined by the inside of the tubing and the inside of the casing of the oil well below the sealing device to the lower ones of the horizontal wells. The other one of the two compositions is supplied through the fluid channel defined by the inside of the casing of the oil well above the sealing device to the upper ones of the horizontal wells. In this embodiment it is preferred that the upper and lower wells of one pair of horizontal wells are arranged to approach each other and it is further preferred that the approaching upper and lower wells intersect, preferably at their distal ends to form a reaction zone distant from the oil well.

That is, when the two compositions come into contact either through cracks between the approaching upper and lower wells or at the point of intersection of the upper and lower wells the chemical reaction producing heat and gases is initiated and a reaction zone distant from the oil well is created. This allows on the one hand to reduce the thermal load on the casing of the oil well and the sealing device (like a packer) and on the other hand allows to thermally treat a greater area around the oil well.

When the chemical reaction is initiated it is possible to only provide only one of the two compositions through one of the two fluid passages to maintain the chemical reaction and thus to continuously thermally treat the oil reservoir. In that stage of the method it is possible to extract the resultant oil or oil containing mixture through the other one of the two fluid passages.

When using the second embodiment of the method according to the present invention where the two compositions are contacted inside of the oil well and the chemical reaction is transferred through openings in the casing of the oil well into the oil reservoir the contacted compositions can be passed through the openings in the casing of the oil well into the upper ones of the horizontal wells so that the reaction can be distributed in a large area of the oil reservoir. Further, the resultant oil or oil containing mixture can be extracted through the lower ones of the horizontal wells to the first fluid passage so that is possible to collect the oil out of a large area of the oil reservoir.

The distance between the upper and the lower ones of one pair of horizontal wells at their proximal ends adjacent to the oil well depends on the thickness of the pay zone and the geological structure of the oil-bearing layer. When using the method of the present invention the distance between the upper and the lower horizontal wells may be 1 to 12 m or even longer. As a preferred range a distance of 3 to 6 m can be defined.

The length of the horizontal wells is likewise dependent on the geological structure of the oil-bearing layer so that they may have a length of up to 200 m or even longer and a preferred range of up to 100 m.

In the method of the present invention it is preferred to use as the first composition a thermal gas emitting composition (TGEC) containing chemical compounds producing heat and gases after the chemical reaction is initiated and to use as the second composition a reaction initiator stabilizer (RIS) containing chemical compounds initiating said chemical reaction when contacting the TGEC.

As such TGEC and RIS the compositions described in the above mentioned WO 2010/043239 A1 can be used, for instance.

In the method of the present invention in the step of maintaining the chemical reaction either both compositions or only one of these two compositions can be supplied to the oil reservoir. When a stable reaction in the pay zone is achieved it is preferred to suspend the introduction of at least one of the first or second chemical compositions and to continue the introduction of the other one of the first or second chemical compositions.

For instance, if the temperature at the place of reaction is in or above the range of about 200-300° C. the introduction of the RIS can be interrupted as at such temperatures the TGEC will react stable also without an additional ignition. That is, with the present invention it is possible to maintain a stable reaction by pumping only TGEC into the oil well. Below a temperature of about 180-200° C. in the productive layer the injection of RIS can be resumed.

When supplying only one composition it is preferred to provide any liquid oxidizer like an aqueous solution or suspension of one or more of ammonium nitrate, potassium nitrate, sodium nitrate and calcium nitrate as these compounds are relatively cheap. That is, it is preferred to mainly add TGEC.

If the temperature in the pay zone has reached a sufficient high value and if sufficient oxygen is present in the pay zone an in-situ combustion of the oil in the pay zone of the oil reservoir can be started. If such in-situ combustion is established it is no longer necessary to introduce the first or second composition introduced so far to continue the production of heat and gases. It is sufficient to introduce air as an oxidant to maintain this in-situ combustion of oil. The air can be introduced through any of the fluid passages having no fluid connection with the fluid passage(s) used for extracting the oil or oil containing mixture. The air can be regarded as one of the first and second compositions as it is introduced to maintain the chemical reaction in the oil reservoir.

With the method of the present invention it is further possible to reverse the flow direction of the oil or oil containing mixture in the treated area of the oil reservoir when the above mentioned stable reaction is achieved and only one of the compositions needs to be introduced. For this the composition is introduced through the first fluid passage and the oil or oil containing mixture is extracted through the second and/or third fluid passages.

This further allows extracting of larger amounts of oil or oil containing mixture as the cross-sectional areas of the second and third fluid passages are usually larger than the cross-sectional area of the first fluid passage.

For improve the control of the method of the present invention the temperature above and/or below the packer can be measured. For this one ore more temperature sensors may be installed above and/or below the packer.

With the method of the present invention high temperatures and high pressure can be achieved in the oil reservoir. In most of the oil reservoirs water is present as the result of recovery methods injecting water or water vapor, like the SAGD method (steam assisted gravity drainage). With the method of the present invention it becomes possible to also thermally treat such water flooded oil reservoirs. As a result of the high temperatures water vapor is produced and with increasing temperature and pressure in the treated area this water vapor changes its physical characteristics, wherein for instance the density and solvent power of the water vapor increases.

Further, under the effect of high temperature and increased pressure there will occur cracking of oil what leads to an enrichment of light volatile fractions in the crude oil. At this stage viscosity is greatly reduced and solubility of gases in oil and mutual solubility of water and oil greatly increases. The mixture of water, oil and gases becomes more liquid (i.e. less viscous) and thus will more easily pass to the oil well for extraction.

Such effects will be further improved when components of the oil containing mixture reach supercritical conditions. Following is given a short overview of the critical temperature $T_k$ and critical pressure $P_k$ of some of the compounds being present in the oil containing mixture.

| Name | Formula | $T_k$ [° C.] | $P_k$ [MPa] |
|---|---|---|---|
| Methane | $CH_4$ | −82.6 | 4.60 |
| Propane | $C_3H_8$ | 96.7 | 4.25 |
| Pentane | $C_5H_{12}$ | 196 | 3.33 |
| Octane | $C_8H_{18}$ | 296 | 2.49 |
| Decane | $C_{10}H_{22}$ | 346 | 2.08 |
| Dodecane | $C_{12}H_{26}$ | 385 | 1.82 |
| Tetradecane | $C_{14}H_{30}$ | 422 | 1.60 |
| Water | $H_2O$ | 374 | 22.1 |

When one or more components of the oil containing mixture reach supercritical conditions the efficiency of the oil extraction is further improved.

This is especially advantageous in heavily water-flooded oil reservoirs where a high amount of water is present in the area around the oil well which reduces efficiency of the usually used recovery methods. Even in these oil reservoirs the method of the present invention allows efficient oil extraction as high temperature and pressure is generated directly in the oil-bearing layer. This results in a reduced viscosity of the oil and in an improved solvent power of the water present in the oil reservoir. Further, thermal stress of the oil well, i.e. the casing of the oil well, and the components introduced into the oil well to carry out the thermal treatment can be kept small as these components are cooled by the continuously introduced fluids.

If aluminum in form of fine particles or granules of aluminum or an aluminum alloy is introduced as one of the compositions, this aluminum will react in the pay zone of the oil reservoir with water, preferably acidic water, to produce hydrogen gas. When additionally the temperature in the treated area of the oil reservoir is increased above about 300 to 350° C. and a sufficient high pressure is reached (about 70 to 200 bar) the oil in the oil reservoir is subjected a hydrocracking process.

With such hydrocracking process the viscosity of the oil in the treated oil reservoir is considerably reduced as the more complex hydrocarbon molecules are broken down to simpler hydrocarbon molecules. A further beneficial effect of the use of the aluminum or aluminum alloys in this process is the reduction of the amount of water present in the oil reservoir.

Such hydrocracking process may be further supported by adding suitable metal catalysts such as metal salts of Mn, Fe, Cr, Co, Ni or V.

The present invention further comprises an apparatus for thermally treating an oil reservoir by separately introducing a first and a second composition into an oil well and contacting the first and second compositions in a pay zone of the oil reservoir to initiate a chemical reaction producing heat and gases, wherein in the pay zone a casing of the oil well comprises openings to allow fluid exchange between the oil well and the oil reservoir, comprising:
  a sealing device being positioned in the pay zone of said oil reservoir, such that said openings in the casing of the oil well are located above and below the sealing device;
  a tubing comprising at least one opening in its distal end section being arranged in the oil well and passed through the sealing device such that the at least one opening is located below the sealing device and the sealing device seals the resultant annular space between the outside of the tubing and the inside of the casing of the oil well,
wherein the inside of the tubing defines a first fluid passage and the inside of the casing of the oil well above the sealing device defines a second fluid passage.

With such apparatus it is possible to separately introduce two fluids through the oil well and into the pay zone of the oil reservoir without admixing the two fluids before reaching the oil reservoir as the arrangement of the tubing and the sealing device allows no fluid contact between the first fluid passage defined by the inside of the tubing and the second fluid passage defined by the inside of the casing of the oil well above the sealing device (or with other words: defined by the annular space between the outside of the tubing and the inside of the casing of the oil well above the sealing device). This allows to initiate a chemical reaction producing heat and gases in the pay zone of the oil reservoir to thermally treat the oil reservoir and to obtain extractable oil or an extractable oil containing mixture.

With such apparatus it is further possible to supply through one of the first and second fluid passages only one fluid or composition to the oil reservoir to maintain the chemical reaction for thermally treating the oil reservoir and to extract at the same time the obtained extractable oil or oil containing mixture through the other one of the first and second fluid passages. Therefore, a continuous thermal treatment of an oil reservoir and at the same time the extraction of oil through one oil well is possible when using the apparatus of the present invention. A respective apparatus can be derived from the apparatus depicted in FIG. 1 by omitting the outer tubing 9.

In a preferred embodiment of the apparatus of the present invention further comprises in addition to the tubing passed through the sealing device, which can be named as the first tubing, a second tubing comprising at least one opening in its distal end section being arranged in the oil well such that the distal end and the at least one opening of the second tubing is positioned in the pay zone above the sealing device, wherein the inside of the second tubing defines a third fluid passage and the apparatus allows fluid exchange between the second and third fluid passages in the pay zone of the oil well.

With such preferred embodiment of the apparatus it is possible to separately introduce two fluids or compositions into the oil well through the second and third fluid passages and to contact the two fluids or compositions in the pay zone of the oil well to initiate and maintain a chemical reaction to thermally treat the oil reservoir and to obtain extractable oil or an extractable oil containing mixture. With such preferred embodiment of the apparatus it is further possible to extract at the same time the obtained extractable oil or oil containing mixture through the first fluid passage.

The apparatus of the present invention is further characterized in that in the area where the sealing device is installed the casing of the oil well comprises no openings. The above mentioned openings provided in the casing of the oil well for a fluid exchange between the oil well and the oil reservoir are located in the pay zone above and below that area.

The sealing device is preferably a packer.

In a specific embodiment of the apparatus of the present invention the first and second tubings are arranged coaxially and the second tubing as an outer tubing encloses the first tubing as an inner tubing. In such arrangement the second fluid passage is defined by the annular space between the outside of the outer tubing and the inside of the casing of the oil well and the third fluid passage is defined by the annular space between the outside of the inner tubing and the inside of the outer tubing.

In a specific embodiment according to the present invention the apparatus further comprises at least one pair of horizontal wells, consisting of an upper and a lower well being arranged substantially parallel to each other or being arranged to approach each other, wherein the upper ones of the horizontal wells are in fluid connection with that part of the oil well located above the packer and the lower ones of the horizontal wells are in fluid connection with that part of the oil well located below the packer.

The upper and lower wells of one pair of horizontal wells are may be spaced by about 1 to 12 m, preferably by about 3 to 6 m. Further, the horizontal wells may have a length of up to about 200 m, preferably of up to 100 m. The horizontal wells may have a diameter of about 5 cm.

The apparatus according to the present invention may further comprise at least one temperature sensor to measure the temperature above and/or below the sealing device or packer.

FIGURES

Figure 2:
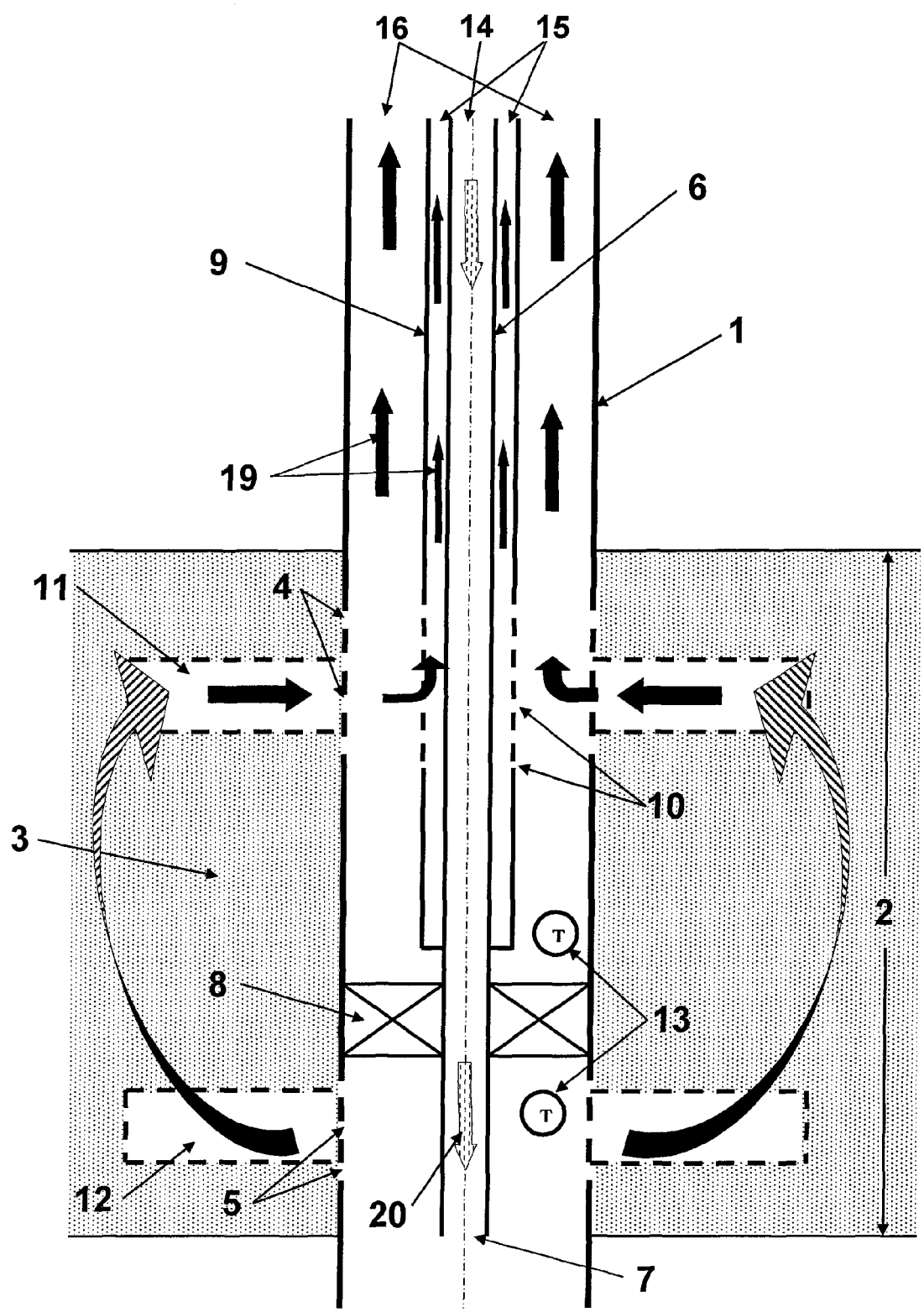

With respect to the method and apparatus of the present invention preferred embodiments are described in the following, wherein references to the enclosed figures are made, wherein:

FIG. 1 shows schematically the arrangement of the components of the apparatus according to the present invention in the pay zone of the oil reservoir to be thermally treated and the fluid passages and flow directions used in the method of thermally treating an oil reservoir according to the present invention; and FIG. 2 shows flow directions used in another specific embodiment of the method of thermally treating an oil reservoir according to the present invention.

Following are shown the meanings of the reference signs used in FIGS. 1 and 2:
1 casing of the oil well
2 pay zone
3 oil reservoir
4 openings in the casing of the oil well above the packer
5 openings in the casing of the oil well below the packer
6 inner tubing
7 opening of the inner tubing
8 packer
9 outer tubing
10 openings of the outer tubing
11 upper well of a pair of horizontal wells
12 lower well of a pair of horizontal wells
13 temperature sensors
14 first fluid passage
15 third fluid passage
16 second fluid passage
17 first composition (e.g. TGEC)
18 second composition (e.g. RIS)
19 oil or oil containing mixture
20 cheap oxidant (e.g. air)

DETAILED DESCRIPTION OF THE PRESENT INVENTION

In FIG. 1 is schematically shown the arrangement of the components of a preferred embodiment of the apparatus according to the present invention in the pay zone of the oil reservoir to be thermally treated. In FIG. 1 are further indicated the fluid passages and flow directions used in a preferred embodiment of the method of thermally treating an oil reservoir according to the present invention.

In the pay zone 2 of the oil reservoir 3 the casing 1 of an oil well is perforated at two sections so that openings 4 and 5 are provided allowing fluid exchange between the inside of the oil well and the oil reservoir surrounding the oil well. Between these two perforated sections a packer 8 is installed in the oil well so that the casing 1 of the oil well comprises openings 4 located above the packer and openings 5 located below the packer.

An inner tubing 6 is inserted into the oil well and through the packer 8 so that the packer 8 seals the resultant annular space between the outside of the inner tubing 6 and the inside of the casing 1 of the oil well. The lower end (distal end) of the inner tubing 6 is open to provide an opening 7 for extracting or injecting a fluid out of or into the oil well. Thus, the inside of the inner tubing 6 defines a first fluid passage 14.

An outer tubing 9 is inserted into the oil well such that it encloses the inner tubing 6 and that the inner and outer tubing are arranged substantially coaxial. In the distal end section the outer tubing 9 is perforated to provide openings 10 for allowing fluid exchange between inside and outside of the outer tubing 9. The perforated section of the outer tubing 9 is located close to the openings 4 in the casing of the oil well above the packer.

With such arrangement of an inner and an outer tubing a second fluid passage 16 is defined by the annular space between the outside of the outer tubing 9 and the inside of the casing 1 of the oil well and additionally a third fluid passage 15 is defined by the annular space between the outside of the inner tubing 6 and the inside of the outer tubing 9.

In the specific embodiment illustrated in FIG. 1 two pairs of horizontal wells are arranged extending substantially rectangular from the oil well. Each pair of horizontal wells consists of an upper well 11 and a lower well 12 being arranged substantially parallel to each other and thus are aligned substantially vertical.

The upper wells of the horizontal wells are arranged to contact the perforated section of the oil well 1 above the packer and the lower wells of the horizontal wells are arranged to contact the perforated section of the oil well 1 below the packer. The upper and lower horizontal wells are spaced by about 5 m, have a diameter of about 5 cm and a length of about 200 m.

The arrangement of such horizontal wells is for instance known from the SAGD method (steam assisted gravity drainage) where hot steam is injected into the upper ones and oil is extracted through the lower ones of the horizontal wells.

In FIG. 1 only two pairs of horizontal wells are depicted. However, it should be noted that also only one pair of horizontal wells and also more than two pairs of horizontal wells can be arranged in fluid connection with the oil well and can be used in the method of thermally treating an oil reservoir according to the present invention.

Further, two temperature sensors 13 are provided in the pay zone of the oil well, one above the packer and one below the packer, to measure the temperatures during the method of thermally treating the oil reservoir.

Following is described a specific embodiment of the method of thermally treating an oil reservoir according to the present invention.

One step of this method is to install into an oil well of the oil reservoir 3 to be thermally treated a packer 8, an inner tubing 6 and an outer tubing 9 as described above and depicted in FIG. 1.

A further step of this method is to separately inject two different compositions 17 and 18 into the oil well and contact them in the pay zone 2 of the oil well to initiate chemical reactions producing heat and gases. As these two compositions the thermal gas emitting composition (TGEC) and the reaction initiator stabilizer (RIS) disclosed in WO 2010/043239 A1 can be used for instance. With these compositions it is possible to initiated and maintain a stable and continuous reaction so that the compositions can be continuously introduced even after the chemical reactions were initiated.

Following is provided a description of these compositions which can be used with the method and apparatus of the present invention.

The TGEC is an aqueous solution or suspension comprising at least one compound selected from the group consisting of hydrazine nitrate, 1,1-di $C_{2-6}$ alkyl hydrazine nitrates and 1,2-di $C_{2-6}$ alkyl hydrazine nitrates, such as 1,1-dimethyl hydrazine nitrate or 1,2-dimethyl hydrazine nitrate, guanidine nitrate, formamide nitric acid adduct, acetamide nitric acid adduct, acetonitrile nitric acid adduct, urea nitric acid adduct, ammonium nitrate, potassium nitrate, sodium nitrate, calcium nitrate, mono, di and tri $C_{1-5}$ alkyl amine nitrates, mono, di and tri $C_{1-5}$ alkanol amine nitrates, $C_{2-6}$ alkylene diamine mono and dinitrates and poly $C_{1-5}$ alkylene polyamine polynitrates.

The RIS is a liquid and comprising at least one compound selected from the group consisting of:
  metal borohydrides $MBH_4$, wherein M is Li, Na or K;
  aminoboranes $(R^1R^2R^3)N.BH_3$, wherein $R^1$, $R^2$ and $R^3$ are independently hydrogen or $C_{1-10}$ alkyl, or wherein $R^1$ is an aryl or pyridine with up to 10 carbon atoms and $R^2$ and $R^3$ are hydrogen;
  dialkylaluminates $MAlH_2R^1R^2$, wherein M is Li, Na or K, and $R^1$ and $R^2$ are independently $C_{1-10}$ alkyl;

aminoalanes $(R^1R^2R^3)N.AlH_3$, wherein $R^1$, $R^2$ and $R^3$ are independently hydrogen or $C_{1-10}$ alkyl;

alkali metal nitrites $MNO_2$; and aluminum or aluminum alloys with magnesium or other metals, which assure stable reaction with alkaline and acidic aqueous solutions.

The TGEC and the RIS are both liquids which can be introduced into the oil reservoir by means of pumps. If the used compounds are not liquid as such they are used as solutions or suspensions in an appropriate solvent. If the TGEC and the RIS are suspensions their viscosity is such that they still are pumpable and can be pumped into the oil well with a rate of up to 4-8 liters per second.

Specific examples of compounds which can be used for the TGEC are mono-, di- and triethanolamine nitrates, mono-, di- and triethylamine nitrates, polyethylene polyamine polynitrates, ethylene diamine mononitrate, ethylene diamine dinitrate, alkylidene diamine mono- and dinitrates.

For the TGEC it is preferred to use an aqueous solution or suspension comprising at least one compound selected from the group consisting of hydrazine nitrate, 1,1-di $C_{2-6}$ alkyl hydrazine nitrates and 1,2-di $C_{2-6}$ alkyl hydrazine nitrates, such as 1,1-dimethyl hydrazine nitrate or 1,2-dimethyl hydrazine nitrate, guanidine nitrate, formamide nitric acid adduct, acetamide nitric acid adduct, urea nitric acid adduct and acetonitrile nitric acid adduct.

The TGEC is preferably the reaction product of reacting nitric acid with the respective amino compounds like reacting hydrazine with nitric acid such that hydrazine nitrate is obtained. By reacting nitric acid with these amino compounds the respective nitrate compounds or nitric acid adducts are obtained.

If the TGEC contains one or more of ammonium nitrate, potassium nitrate, sodium nitrate or calcium nitrate these nitrates are contained in the TGEC with not more than 50% by mass, preferably not more than 30% by mass.

The pH value of the TGEC is preferably about 3 to 14 depending on the RIS and TGEC compositions. It is further preferred that the mixture of TGEC and RIS has a pH value <7.

For the above mentioned aminoboranes, dialkylaluminates and aminoalanes it is preferred that the alkyl moieties $R^1$, $R^2$ and $R^3$ are methyl or ethyl.

For the above mentioned alkali metal nitrites it is preferred to use sodium nitrite or potassium nitrite.

If aluminum or an aluminum alloy with magnesium or other metals, which assure stable reaction with alkaline and acidic aqueous solutions is used for the RIS the aluminum or aluminum alloy can be used as a fine dispersed, pyrophoric material preferably having a particle size of about 1 µm or less and/or in the form of granules preferably having a particle size of about 0.1 to 5 mm, more preferably 1 to 2 mm. The aluminum and aluminum alloys may contain as a further metal also copper, gallium and/or indium.

If the temperature in the reaction zone of the oil well has reached about 250-300° C. a suspension of such granular aluminum or aluminum alloy in an organic solvent can be introduced into the oil well.

The aluminum is oxidized in an exothermic reaction to give aluminum oxide wherein 7 kg of Al produce a thermal energy of about 50,000 Kcal. For example, to increase the temperature of 1 kg of the productive layer formation by 100° C. a thermal energy of about 20 Kcal is to be provided, wherein increasing the temperature of 1 kg of petroleum by 100° C. requires a thermal energy of about 50 Kcal.

The oxidation of aluminum results in formation of aluminum oxide particles which deposits in the newly formed fractures in the pay zone to hold them open so that the flow of oil towards the oil well and thus the oil extraction is further improved.

If aluminum or aluminum alloys with magnesium or other metals, which assure stable reaction with alkaline and acidic aqueous solutions, is used as the RIS, the chemical system may further comprise a solution or suspension of one or more of an acid or a solution or suspension of one or more of an alkali to be contacted with said aluminum or aluminum alloys.

If aluminum or its alloys are used and introduced into the oil well as a RIS it may be contacted after introduction with an acid or an alkali to initiate and maintain a thermochemical reaction producing heat and gases. For this the acid or alkali can be introduced into the oil well in form of a solution or suspension of one or more acids or of one or more alkalis. As such solutions aqueous solutions of hydrochloric acid (HCl) or sodium hydroxide (NaOH) can be mentioned, for instance.

For preparing the solution or suspension of the RIS any appropriate solvent may be used. In dependence of the materials used as the RIS such appropriate solvent may be water or an organic solvent selected from the group consisting of petrol, ligroin, white spirit, kerosene and naphtha. If, for instance, metal borohydrides or aminoboranes are used for the RIS water with a pH value >7 can be used as a solvent. For achieving such pH value ammonia or an alkali metal hydroxide can be added. If a material is used which reacts with water one or more of the above organic solvents may be used.

At the beginning of a thermochemical treatment of an oil well RIS is usually used in the form of alkali metal borohydride in a quantity of about 5-7% by mass or in the form of alkali metal nitrite in a quantity of about 30% by mass with respect to the mass of TGEC injected into the oil well. After the chemical reactions are initiated it is sufficient to use RIS in the form of alkali metal borohydride in a quantity of about 1% by mass or in the form of alkali metal nitrite in a quantity of about 15-20% by mass with respect to the mass of TGEC. With such chemical system it is possible to react up to several hundred tons of material per day in the pay zone of an oil reservoir, being about 50-100 times the amount of material which can be reacted per day with the systems and methods reacting the compositions in a batch wise manner.

Further, in contrast to the FOC used in the prior art, the above described TGEC does not contain an excess of oxygen and thus has no oxidizing character so that no explosive composition is created with the admixture of petroleum. The decomposition of 1 kg of TGEC results in emitting a quantity of heat of about 1000-3200 kcal.

With the illustrated chemical system it is possible to introduce TGEC and RIS into the oil well and to react these materials in the productive layer in an amount of up to about 100 tons per day and thus to produce more heat per time and to improve efficiency of the oil recovery process as it is possible to maintain a stable and continuous reaction by continuously pumping reactive materials into an oil well. With such chemical system a large amount of heat and gases can already be produced with an amount of about 1 ton of reactive materials introduced into the oil well. To achieve a high efficiency of the oil recovery process it is, however, preferred to continuously introduce the reactive materials and thus to introduce at least about 10 tons/day, more preferably at least about 20 tons/day.

With the method and apparatus according to the present invention by using the above described compositions it becomes further possible to recover petroleum also from oil reservoirs containing mainly high viscous petroleum which could not be efficiently recovered by using the methods known so far without introduction of extensive amounts of water.

The RIS or TGEC can additionally contain one or more soluble metal salts of Mn, Fe, Cr, Co, Ni or V. These metals are able to catalyze an oxidation of the petroleum, so that additional heat can be produced. These metal salts are contained in the RIS in an amount of not more than 10% by mass with respect to the total mass of the RIS. Especially preferred metal salts are $Fe(NO_3)_3$, $Mn(NO_3)_2.6H_2O$, $Mn(SO_4).6H_2O$, $KMnO_4$, $K_2MnO_4$, $K_2CrO_4$, $Na_2CrO_4$, $K_2Cr_2O_7$, $Na_2Cr_2O_7$, $Co(NO_3)_3$, $NH_4VO_3$, $NaVO_3$ and $KVO_3$.

Following is given an overview of preferred ratios of the components contained in the TGEC and RIS which can be used with the method and apparatus according to the present invention. The ratios are expressed as % by mass related to the combined mass of reagents contained in the TGEC and RIS, yet without the solvents used for preparing the respective solutions or suspensions.

| The TGEC compounds: | |
|---|---|
| 1. hydrazine nitrate<br>2. 1,1-di $C_{2-6}$ alkyl hydrazine nitrates and 1,2-di $C_{2-6}$ alkyl hydrazine nitrates, such as 1,1-dimethyl hydrazine nitrate or 1,2-dimethyl hydrazine nitrate<br>3. guanidine nitrate<br>4. formamide nitric acid adduct<br>5. acetamide nitric acid adduct<br>6. acetonitrile nitric acid adduct<br>7. urea nitric acid adduct | in sum<br>30-70% by mass |
| The TGEC compounds: | |
| 1. Mono-, di- and triethanolamine nitrates<br>2. Mono-, di- and tri $C_{1-5}$ alkyl amine nitrates, such as Mono-, di- and triethylamine nitrates<br>3. Polyethylene-polyamine polynitrate<br>4. $C_{1-5}$ alkylidene diamine mono- and dinitrate, such as Ethylenediamine mononitrate or Ethylenediamine dinitrate | if present at least 10% by mass |
| The RIS compounds: | |
| 1. metal borohydrides $MBH_4$ | 1-10% by mass |
| 2. aminoboranes $(R^1R^2R^3)N \bullet BH_3$ | 0.5-5% by mass |
| 3. dialkylaluminates $MAlH_2R^1R^2$ | 1.5-7% by mass |
| 4. aminoalanes $(R^1R^2R^3)N \bullet AlH_3$ | 3-10% by mass |
| 5. alkali metal nitrites $MNO_2$ | 10-35% by mass |
| 6. aluminum or aluminum alloys with magnesium or other metals, which assure stable reaction with alkaline and acidic aqueous solutions. | 0.3-70% by mass |
| Further compounds to be added: | |
| Soluble salts of Mn, Fe, Cr, Co, Ni or V | 1-4% by mass |
| Ammonium nitrate, potassium nitrate, sodium nitrate, calcium nitrate | 0-50% by mass |
| Solutions or suspensions of acids (like aqueous solution of HCl) or alkalis (like aqueous solution of NaOH) | |

The TGEC and RIS can be pumped into the oil reservoir with a rate of about 4-8 liters per second.

In the preferred embodiment shown in FIG. 1 the second and third fluid passages have different sectional areas of flow such that the second fluid 16 passage allows higher flow rates than the third fluid passage 15. As the TGEC is usually used in a higher amount than the RIS it is preferred to inject the TGEC 17 into the second fluid passage and to inject the RIS 18 into the third fluid passage 15. The injection of the two compositions 17 and 18 can be achieved by using suitable pumps.

When reaching the pay zone 2 the two compositions 17 and 18 are mixed as the distal end section of the outer tubing 9 is perforated to provide openings 10 for allowing fluid exchange between the second and third fluid passages. This mixing initiates the chemical reactions and as a result of continuously pumping down the TGEC 17 and RIS 18 the reacting admixture is transferred through the openings 4 in the casing 1 into the upper wells 11 of the pairs of horizontal wells and is thus distributed in the oil reservoir 3.

The chemical reactions produce large amounts of heat and gases. This causes a temperature increase in the treated area of the oil reservoir what reduces the viscosity of the oil and additionally produces fractures in the formation so that the extraction of oil is further improved. As a result a liquid can be collected in the lower wells 12 of the pairs of horizontal wells and can be extracted through the openings 5 in the casing 1 into the oil well and through the first fluid passage 14 up to the surface. The collected and extracted liquid 19 comprises oil and dependent on the conditions present in the oil well also other components. If the method according to the present invention is used in water-flooded oil reservoirs the collected and extracted liquid 19 will comprise large amounts of water. In the present application this liquid will be designated as an oil or oil containing mixture 19.

In contrast to the SAGD method where mainly gravity is the driving force for the collection of oil (usually a mixture of oil and water) in the lower wells the method according to the present invention additionally uses a pressure increase in the treated area of the oil reservoir for the collection and extraction of the oil or oil containing mixture 19. This increase of pressure is caused by the continuous pumping of liquids 17 and 18 into the oil reservoir and by the initiated reactions producing large amounts of hot gases. The pressure difference between the upper and lower wells of the pairs of horizontal wells may vary from several atmospheres to several tens of atmospheres. This allows a more efficient extraction of oil. The higher pressure values achieved with the method according to the present invention further causes more crack formations than in the SAGD method and thus further improves oil extraction. The formed cracks will reach the point of pressure relief, i.e. the lower wells 12 where the pressure is decreased by the continuous and intensive extracting of the oil or oil containing mixture 19. Thus, the extraction of oil is further improved. The improved capability of producing and collecting extractable oil or an oil containing mixture is achieved with the method according to the present invention along the entire length of the horizontal wells (in the present case about 200 m).

A further advantage of the method according to the present invention compared to the SAGD method is that much lower amounts of water are introduced into the oil reservoir.

In the following is provided a closer look onto the method according to the present invention.

One of the control parameters of the method according to the present invention are the temperatures in the oil well above and below the packer 8 where the temperature sensors 13 are installed. Depending on the temperature values determined with these temperature sensors 13 the flow amounts of the injected compositions TGEC and RIS may be regulated.

One upper temperature limit is the maximum temperature allowed for the packer 8 and the casing 1 of the oil well which usually at least partly consists of cement. In the following illustration a maximum temperature of about 300° C. is assumed for the packer 8 and the cement used for the casing 1 of the oil well. However, it should be noted that also materials can be used for the packer 8 and the casing 1 allowing higher maximum temperatures so that the method and apparatus of the present invention are not limited to the aspects mentioned in the following illustration.

In a first stage the oil reservoir is heated by reacting TGEC and RIS to reach a temperature at the temperature sensor 13 below the packer of about 250-280° C. At such temperature TGEC can react/decompose producing heat and gases without further supply of an initiator (RIS). At this stage the injection of RIS can be reduced or even suspended. This allows a cost efficient process control as the components of the RIS are usually relatively expensive compared to the components used for the TGEC. In principal, the supply of RIS can be reduced or suspended if the temperature of the reaction reaches a value of 200° C. or higher. It is then sufficient to supply only TGEC to maintain a stable reaction in the pay zone of the oil reservoir and the TGEC may be supplied through the second and/or third fluid passages 16 and 15.

If a stable temperature of about 250-280° C. is obtained in the horizontal wells the method according to the present invention may be varied by also reduce or even suspend the supply of TGEC and by introducing air or any other cheap oxidant supply into the oil reservoir. At that stage a controlled combustion of oil is possible, a so called low-temperature oil combustion with a reaction temperature of about 300° C. and with a heat production Q of about 40 MJ per kilogram of burned oil.

Following is given an estimation of the percentage of oil to be burned to heat up the material (like rock) containing the oil to be extracted at the stage where only a relatively cheap oxidant is supplied to maintain the reaction in the oil reservoir.

As an example of such cheap oxidant potassium nitrate is assumed. About 2-3 kg of potassium nitrate are required to oxidize 1 kg of oil. With the following formula (1) the mass M of heated collector having a porousness of about 20% is calculated:

$$Q = C \cdot M \cdot \Delta T \quad (1)$$

wherein:
Q=amount of heat produced,
C=specific heat capacity of collector with oil,
M=mass of collector with oil,
$\Delta T$=temperature increase.

The collector is the material of the oil reservoir containing the oil in its pores.

With a specific heat capacity C of 1 kJ/(kg·K) and a temperature increase $\Delta T$ of 100 K and an amount of heat Q of 40 MJ (produced per kg of burned oil) a mass of 400 kg can be calculated. This means, for heating up 400 kg of collector by 100 K it is required to oxidize 1 kg of oil in the reservoir.

The density of the collector material (e.g. rock) can be assumed to be about 2.5 kg/l so that this result in a volume V of about 160 l of rock having a mass of about 400 kg that can be heated with 1 kg of oil.

If it is further assumed that the amount of oil in the pores of the calculated collector volume is about 32 liters corresponding to about 28 kg of oil. That is, 1 kg of oil is to be burned to heat up 400 kg of rock comprising 28 kg of oil. Therefore only about 4% of the oil contained in the treated area is to be burned to extract oil from this treated oil reservoir.

The price for 2-3 kg of potassium nitrate is about 16-20 Russian rubles. This amount of potassium nitrate is necessary to produce about 40 MJ. Therefore, to obtain 1 MJ of heat in the oil reservoir using potassium nitrate, it is required to spend about 0.4-0.5 Russian rubles for chemical reagents.

When comparing the costs of the method according to the present invention with the costs of the SAGD method it can be summarized that the cost for producing hot water vapor to be pumped from surface down into the oil reservoir to supply 1 MJ of heat to the reservoir is about 10 times bigger than when using the method according to the present invention.

One reason for such significant difference is that in the SAGD method the oil or bitumen burned for producing the heat for the thermal treatment is burned at the surface whereas in the present method the heat is produced directly where it is used for the thermal treatment, i.e. it is produced down in the oil reservoir.

In FIG. 2 are shown flow directions used in a specific embodiment of the method of thermally treating an oil reservoir according to the present invention. In this method, when the above mentioned stage where only one fluid like the TGEC or any other cheap oxidant can be supplied to maintain a constant reaction in the pay zone of the oil reservoir need to be supplied, such fluid can be introduced through the first fluid passage 14, that is through the inner tubing 6, and is then forwarded through the openings 5 and the lower well 12 to the oil reservoir. The oil or oil containing mixture 19 is then extracted through the upper wells 11, the openings 4 and through one or both of the second and third fluid passages 16 and 15. Such reversed flow direction regarding the oil in the oil reservoir is possible as the main driving force in the present method is the pressure difference caused by pumping in the fluid and by the production of large amounts of heat and gases.

With such method a much greater sectional area can be used for the extraction of the oil or oil containing mixture, i.e. the sectional areas of the second and third fluid passages, as compared to the embodiment shown in FIG. 1. Further, the fluid introduced into the first fluid passage 14 can be used to cool the packer 8.

In the following is provided an estimation showing that the method of thermally treating an oil reservoir according to the present invention can be successfully applied at oil reservoirs being intensively water-flooded.

It is assumed that in such heavily water-flooded oil reservoir the pores contain about 90% of water and about 10% of oil. The specific heat capacity of water is 4.2 kJ/(kg·K).

On basis of the above formula (1) it can be calculated that in such case the oxidation (burning) of 1 kg of oil will cause a temperature increase of about 80° C. for 400 kg of rock, the pores of which contain 32 liters of fluid (90% water and 10% oil). As a result of the heating the viscosity of the fluid (water+ oil) will be 4-5 times reduced, the fluid will flow from the reservoir into the oil well and then will be pumped out to the surface.

Thus, it can be summarized that for extracting 3.2 liter of oil it is necessary to burn 1 liter of oil being about one third of the oil. With the methods known so far it was not regarded possible to achieve a cost efficient extraction of oil from such heavily water-flooded oil reservoirs.

With the apparatus and method according to the present invention it is further possible to introduce fluids for initiating and maintaining a thermal treatment of the oil reservoir while simultaneously extracting the oil.

The invention claimed is:

1. A method of continuously thermally treating an oil reservoir comprising the steps of:
   initiating a chemical reaction between a first and a second composition thereby producing heat and gases for thermally treating the oil reservoir to obtain extractable oil or an extractable oil containing mixture, by separately introducing into an oil well of the oil reservoir the first and the second composition through separated fluid passages provided in said oil well and contacting the first and second compositions in a pay zone of the oil reservoir;

maintaining the chemical reaction between the first and second compositions in the oil reservoir by continuing the introduction of at least one of said first and second compositions; and extracting the resultant oil or oil containing mixture during said step of maintaining the chemical reaction through a fluid passage provided in said oil well, wherein inside said oil well the fluid passage used for extracting the oil or oil containing mixture has no fluid connection with any fluid passage used for continuing the introduction of at least one of said first and second compositions to maintain the chemical reaction.

2. The method according to claim 1, wherein the first and second compositions are passed through openings in a casing of the oil well allowing fluid exchange between the oil well and the oil reservoir, and the first and second compositions are contacted outside of the casing of said oil well to initiate the chemical reaction.

3. The method according to claim 2, wherein the separated fluid passages used for introducing the first and second compositions and the fluid passage used for extracting the oil or oil containing mixture are provided in said oil well by arranging one or more tubings each comprising at least one opening in a distal end section of the tubing such that the distal end section of each of the one or more tubings is located in a pay zone of the oil well, and by arranging a sealing device in said oil well such that the openings in the casing of the oil well allowing fluid exchange between the oil well and the oil reservoir are located above and below the sealing device and such that one tubing extends through the sealing device, so that the at least one opening in the distal end section of this tubing is located below the sealing device, and the sealing device seals the space between the outside of the tubing extending through the sealing device and the inside of the casing of the oil well.

4. The method according to claim 3, wherein the sealing device is a packer.

5. The method according to claim 3, wherein the openings in the casing of the oil well are not located in the area where the sealing device is installed.

6. The method according to claim 3, wherein at least one pair of horizontal wells, consisting of an upper and a lower well being provided, wherein the upper and lower wells of each pair of horizontal wells are arranged substantially parallel to each other or are arranged to approach each other and wherein the upper ones of the horizontal wells are in fluid connection with that part of the oil well located above the sealing device and the lower ones of the horizontal wells are in fluid connection with that part of the oil well located below the sealing device.

7. The method according to claim 3, wherein the temperature above and/or below the sealing device is measured.

8. The method according to claim 1, wherein the separated fluid passages used for introducing the first and second compositions have fluid connection in the pay zone of the oil well, the first and second compositions are contacted in the pay zone of the oil well, and wherein the method further comprises the step of transferring the chemical reaction into the oil reservoir by passing the contacted compositions through openings in a casing of the oil well allowing fluid exchange between the oil well and the oil reservoir.

9. The method according to claim 8, wherein the separated fluid passages used for introducing the first and second compositions and the fluid passage used for extracting the oil or oil containing mixture are provided in said oil well by arranging two tubings each comprising at least one opening in a distal end section of the tubing such that the distal end section of each tubing is located in the pay zone of the oil well, and by arranging a sealing device in said oil well such that the openings in the casing of the oil well allowing fluid exchange between the oil well and the oil reservoir are located above and below the sealing device and such that one of the two tubings extends through the sealing device so that the at least one opening in the distal end section of this tubing is located below the sealing device and the at least one opening in the distal end section of the other tubing is located above the sealing device and the sealing device seals the space between the outside of the tubing extending through the sealing device and the inside of the casing of the oil well.

10. The method according to claim 9, wherein the two tubings are arranged coaxially defining an inner and an outer tubing, the inner tubing extending through the sealing device and defining a first fluid passage, a second fluid passage is defined by an annular space between the outside of the outer tubing and the inside of the casing of the oil well and a third fluid passage is defined by an annular space between the outside of the inner tubing and the inside of the outer tubing.

11. The method according to claim 10, wherein in the step of initiating the chemical reaction one of the first and second compositions is introduced into the oil well through one of the second and third fluid passages and the other one of the first and second compositions is introduced into the oil well through the other one of the second and third fluid passages and wherein the resultant oil or oil containing mixture is extracted through the first fluid passage.

12. The method according to claim 10, wherein the flow directions of the continuously introduced composition and the extracted oil or oil containing mixture in the oil reservoir are reversed by introducing said composition through the first fluid passage and extracting the oil or oil containing mixture through the second and/or third fluid passages.

13. The method according to claim 1, wherein the first composition is a thermal gas emitting composition (TGEC) containing chemical compounds producing heat and gases after the chemical reaction is initiated and wherein the second composition is a reaction initiator stabilizer (RIS) containing chemical compounds initiating said chemical reaction when contacting the TGEC.

14. The method according to claim 1, wherein during the step of maintaining the chemical reaction the introduction of at least one of the first or second compositions is suspended and the introduction of the other one of the first or second compositions is continued when a stable reaction in the pay zone is achieved.

15. The method according to claim 1, wherein the introduction of the first and second compositions is suspended and only air is introduced through one of the fluid passage to maintain the chemical reaction in the oil reservoir when an in-situ combustion of the oil in the pay zone of the oil reservoir has started.

16. The method according to claim 1, wherein oil in the oil reservoir is subjected a hydrocracking process.

17. An apparatus for thermally treating an oil reservoir by separately introducing a first and a second composition into an oil well and contacting the first and second compositions in a pay zone of the oil reservoir to initiate a chemical reaction producing heat and gases, wherein in the pay zone a casing of the oil well comprises openings to allow fluid exchange between the oil well and the oil reservoir, said apparatus comprising:

a sealing device being positioned in the pay zone of said oil reservoir, such that said openings in the casing of the oil well are located above and below the sealing device;

a tubing comprising at least one opening in a distal end section of the tubing and wherein the distal end section is arranged in the oil well such that the opening is passed through the sealing device so that the at least one opening is located below the sealing device and the sealing device seals the resultant annular space between the outside of the tubing and the inside of the casing of the oil well, at least one pair of horizontal wells, consisting of an upper and a lower well, wherein the upper and lower wells of each pair of horizontal wells are arranged substantially parallel to each other or are arranged to approach each other and wherein the upper ones of the horizontal wells are in fluid connection with that part of the oil well located above the sealing device and the lower ones of the horizontal wells are in fluid connection with that part of the oil well located below the sealing device, wherein the inside of the tubing defines a first fluid passage and the inside of the casing of the oil well above the sealing device defines a second fluid passage.

18. The apparatus according to claim 17, wherein in addition to the tubing passed through the sealing device, the first tubing, the apparatus further comprises:

a second tubing comprising at least one opening in a distal end section of the tubing and wherein the distal end section is arranged in the oil well such that the distal end and the at least one opening of the second tubing is positioned in the pay zone above the sealing device wherein the inside of the second tubing defines a third fluid passage and the apparatus allows fluid exchange between the second and third fluid passages in the pay zone of the oil well.

19. The apparatus according to claim 18, wherein the first and second tubings are arranged coaxially and the second tubing as an outer tubing encloses the first tubing as an inner tubing.

20. The apparatus according to claim 17, wherein the openings in the casing of the oil well are not located in the area where the sealing device is installed.

21. The apparatus according to claim 17, wherein the sealing device is a packer.

22. The apparatus according to claim 17, further comprising at least one temperature sensor to measure the temperature above and/or below the sealing device.

\* \* \* \* \*